June 5, 1923. 1,457,964
H. DOTY
RECORD APPLIANCE
Filed Jan. 5, 1920 2 Sheets-Sheet 1
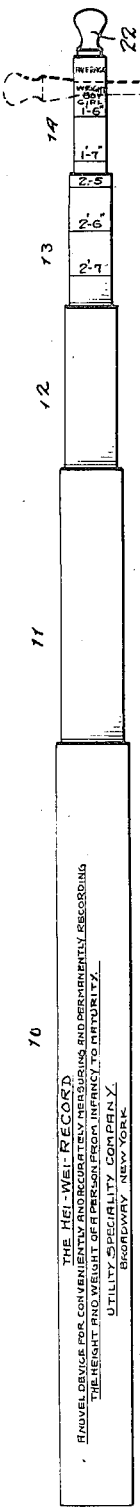
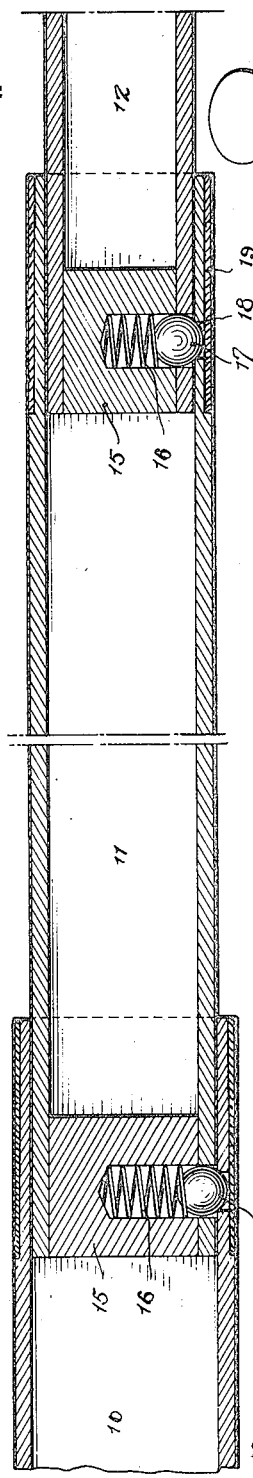
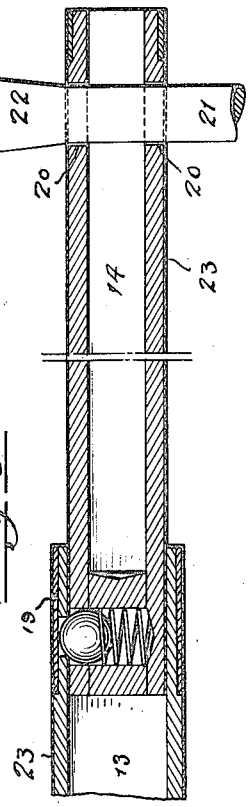
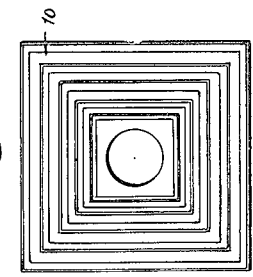
Inventor
HARRY DOTY
by his Attorneys June 5, 1923.

H. DOTY 1,457,964

RECORD APPLIANCE

Filed Jan. 5, 1920

THE "HEI WEI" RECORD.

A NOVEL DEVICE FOR CONVENIENTLY AND ACCURATELY MEASURING AND PERMANENTLY RECORDING
THE HEIGHT AND WEIGHT OF A PERSON FROM INFANCY TO MATURITY

UTILITY SPECIALTIES COMPANY, N.Y.

BIRTH AND DEVELOPMENT RECORD OF

FULL NAME
DATE OF BIRTH _____ HEIGHT _____ WEIGHT _____
PLACE OF BIRTH _____ CITY _____ STATE _____
FATHER _____ MOTHER _____
GRAND FATHER _____ GRAND MOTHER _____
GRAND FATHER _____ GRAND MOTHER _____

THE PURPOSE OF THE "HEI-WEI" MEASURE IS TO PROVIDE A CONVENIENT MEANS OF MEASURING THE HEIGHT OF A PERSON AT ANY PERIOD FROM BIRTH TO MATURITY, AND RECORD THEREON THE GROWTH BOTH HEIGH AND WEIGHT, IN A WAY THAT WILL CLEARLY SHOW PROGRESS FROM TIME TO TIME, OPPOSITE SIDES OF THE MEASURE GIVE AVERAGE HEIGHTS AND WEIGHTS, ARRANGED SO AS TO SHOW UNDER OR OVER DEVELOPMENT OF THE PERSON

THE "HEI WEI" MEASURE IS PROPERLY LIMITED TO THE USE OF ONE PERSON. HEIGHTS AND WEIGHTS SHOULD BE TAKEN AND RECORDED AS FREQUENTLY AS THERE IS APPRECIABLE PROGRESS. A CHILD WILL FIND GREAT PLEASURE IN WATCHING ITS OWN DEVELOPMENT, AND AFTER IT HAS REACHED FULL GROWTH IT WILL FIND THE SAME DEGREE OF SATISFACTION IN THE POSSESSION OF THE RECORD THAT THE PARENTS DID IN WATCHING AND RECORDING ITS DEVELOPMENT

DIRECTIONS

THE "HEI WEI" MEASURE CONSISTS OF A NEST OF FIVE SECTIONS AND A HEAD-PIECE WHICH FITS IN THE INSIDE SECTION. THIS IS A SHORT PIECE WHICH IS SET HORIZONTALLY IN THE END OF THE INSIDE SECTION. AFTER THE LATTER IS DRAWN OUT.

1- DRAW OUT THE INSIDE SECTION AS FAR AS IT WILL GO, AND SET THE HEAD-PIECE IN THE HORIZONTAL POSITION. THE "HEI WEI" WILL NOW MEASURE UP TO 2 FT. 5 IN. AS SHOWN AT THE BOTTOM OF THE DRAWN OUT SECTION.

2- IF THE HEIGHT IS LESS 2 FT. 5 IN., PUSH SECTION DOWN TO THE PROPER HEIGHT. OPPOSITE THE HEIGHT WRITE THE AGE, IN YEARS AND MONTHS.

3- DRAWING OUT THE NEXT INSIDE SECTION WILL MEASURE UP TO 3 FT. 6 IN. THE NEXT UP TO 4 FT. 6 IN., AND THE LAST UP TO 5 FT. 11 IN.

NOTE: WEIGHTS SHOULD BE RECORDED ON THE SLIDE OPPOSITE TO THAT WHICH PROVIDES FOR HEIGHTS, AVERAGE HEIGHTS AND WEIGHTS ARE GIVEN ON THE OTHER TWO SLIDES

*Fig. 6.*

| AVERAGE HEIGHT BOYS, GIRLS | AGE | AVERAGE HEIGHT | WEIGHT |
|---|---|---|---|
| 1'-6" | | 1'-6" | |
| 1'-7" | Birth | 1'-7" | 7 lbs |
| 1'-8" | | | 7½ lbs |
| 1'-8½" BIRTH 1'-9" | 1 MO | 1'-8" 1'-9" | 8½ lbs 8 lbs |
| 1 MO. 1'-10" | 2 MO | 1'-10" | 10 lbs 9½ |
| 2 MO. 1'-11" | | 1'-11" | 12 lbs |
| 3 MO. 2' | 3 MO | 2' | 13½ lbs 10½ |
| 3½ MO 2'-1" | | 2'-1" | 14½ lbs |
| 4 MO. 2'-2" | 4 MO | 2'-2" | 16 lbs 12½ |
| 5 MO. 2'-3" | 5 MO | 2'-3" | 17½ 15 |
| 6½ MO 2'-4" | 6 MO | 2'-4" | 18½ 16½ |
| | | | 18¾ |

Inventor

HARRY DOTY by his Attorneys

Patented June 5, 1923.

1,457,964

UNITED STATES PATENT OFFICE.

HARRY DOTY, OF CALDWELL, NEW JERSEY.

RECORD APPLIANCE.

Application filed January 5, 1920. Serial No. 349,592.

*To all whom it may concern:*

Be it known that I, HARRY DOTY, a citizen of the United States of America, residing in Caldwell, in the county of Essex and State of New Jersey, have invented certain new and useful Improvements in Record Appliances, of which the following is a specification.

My invention relates to a record appliance, and particularly to an article which not only embodies means for ascertaining physical development, but also affords a permanent record of such development. The underlying thought of my invention is to provide not only a compact, collapsible instrument to measure a child's growth, but also to provide on that instrument a chart on which a record of that growth, and other development, is kept. Preferably also, the appliance embodies a chart of average heights and weights for comparison with the development of the child by whom the appliance is used.

In the accompanying drawings—

Fig. 1 is a side elevation of an instrument in which my invention is embodied in one form, the parts being shown partially extended;

Fig. 2 is a broken longitudinal section through the lower portion thereof;

Fig. 3 is a similar view of the upper portion thereof;

Fig. 4 is an end elevation of the device;

Fig. 5 is a development of the several faces of the bottom section; and

Fig. 6 is a similar view of the top section.

Referring to the structural features of the appliance, the latter is here shown as comprising a series of five telescopic sections 10, 11, 12, 13 and 14 nested together, but adapted to be drawn out to form a standard, the height of which depends upon the number and length of the several sections. The extent to which the sections may be drawn out is limited by any suitable stop device. I have here shown each section provided at its inner end with a block 15 recessed to form a well for a spring 16 and stud, here shown in the form of a ball 17, which normally rides against the inner face of the surrounding section. When the inner section is pulled out the ball 17 is pressed into the recess or hole 18 located at a predetermined point in the surrounding section and is there halted. To reenforce the ends of the several sections, and to prevent the extrusion of the balls 17 through the holes 18, a sheet metal ferrule 19 is fitted over the end of the section and countersunk flush with the outer face thereof. The innermost or top section 14 is transversely pierced at 20 to receive a cross pin 21 normally housed longitudinally within the end section 14 and held therein by the frictional engagement of its enlarged head 22. When the apparatus is to be utilized, the pin 21 is withdrawn from the interior of the section 14 and inserted through the holes 20 as indicated in dotted lines in Fig. 1.

The chart feature of the invention is illustrated in Figs. 5 and 6. To this end the outer faces of the several sections 11, 12, 13 and 14 are graduated. This may be conveniently accomplished by gluing or otherwise securing on each section a printed chart 23. One of these is shown in Fig. 6. Each chart comprises a different record for each of the several faces $a$, $b$, $c$ and $d$ thereof, it being understood that the character of the chart remains the same for the corresponding faces of the several sections. Thus, the face $a$ displays the average height of a child at different ages; face $b$ affords charting spaces for the height of the particular child using the appliance, at different ages; face $c$ affords a record of average weights for given heights, while face $d$ affords charting spaces for entries of the particular child's weight at given heights.

Section 10, which forms the outer casing element of the appliance, bears on faces $a$ and $b$ printed directions setting forth the objects and use of the appliance, while on face $c$ is a chart for the name and birth record of the child. Face $d$ is used for advertising matter.

The use of the appliance is readily understood. The proper entries of birth and ancestry having been made upon the face $c$ of the outer section 10, the first entry should be made then upon the development record afforded by sections 11, 12, 13 and 14. As will be noted in Fig. 6, the average length of a child at birth is $1'-8\frac{1}{2}''$. The height of the child whose record is to be kept is then determined by pulling out section 14, removing the cross pin 21 from its end and inserting it in the transverse holes 20. If upon measurement the child proves to be $1'\ 7''$ in height, as indicated by the reading disclosed on section 14 at the point at which it emerges from section 10, an appropriate entry to this effect is made on face *b* of the record at the point indicated in the drawing opposite the scale reading 1′ 7″. The child is then weighed, and its weight inserted in the space on face *d* opposite the chart indication of the height 1′ 7″. An entry of 7½ pounds is indicated in this column by way of example.

It will be readily understood that appropriate entries made upon the charts at regular monthly, or other time, intervals, afford a systematic and graphic record of the development of the child, which is not only a matter of interest, but a matter of instruction and guide to the parent, or other interested party.

Various modifications in detail of construction, and in the nature of the records kept, will readily occur to those dealing with the problem, and I do not limit my invention to the precise construction and records shown by way of example in the drawings.

I claim as my invention—

1. A record appliance comprising a collapsible, sectional chart bearing a measuring scale, and associated charting spaces for personal record entries at different ages, for the purpose specified.

2. A record appliance comprising a collapsible, sectional chart bearing a measuring scale, a chart of averages, and associated charting spaces for personal record entries at different ages, for the purpose specified.

3. A record appliance comprising a collapsible, sectional, tubular member, certain of said sections having on their outer faces a measuring scale, and charting spaces for personal record entries at different ages, for the purpose specified.

4. A record appliance comprising a collapsible, sectional tubular member, certain of said sections having on their coresponding outer faces a measuring scale and charting spaces for personal record entries at different ages, for the purpose specified.

5. A record appliance comprising a collapsible, sectional tubular member, certain of said sections having on their corresponding outer faces a measuring scale and charting spaces for personal record entries at different ages, and on certain other corresponding faces a record of averages, at different ages, for the purpose specified.

6. A record appliance comprising a collapsible, sectional, tubular member, the innermost section carrying a measuring rod adapted to be supported thereby in a position at right angles to the axis of appliance, certain of said sections having on their outer faces a scale, and an associated chart for personal record entries at different ages, for the purpose specified.

7. A record appliance comprising a sectional, telescopic member, the telescoping sections having a scale adapted to be read at the end of the outer casing section, and an associated chart for personal record entries at different ages.

8. A record appliance comprising vertical telescopic members, the outer casing member having a chart for birth and ancestor entries, the inner telescoping sections bearing a sectional scale adapted to be read at the end of the outer casing section and associated chart spaces for personal record entries, for the purpose specified.

In testimony whereof I have signed my name to this specification.

HARRY DOTY.